United States Patent
Krafft et al.

(10) Patent No.: US 9,815,983 B2
(45) Date of Patent: Nov. 14, 2017

(54) BITUMINOUS COMPOSITION IN THE FORM OF GRANULES AND METHOD FOR PREPARING SAME

(71) Applicant: EIFFAGE TRAVAUX PUBLICS, Neuilly sur Marne (FR)

(72) Inventors: Serge Krafft, Irigny (FR); Frederic Loup, Villeurbanne (FR)

(73) Assignee: EIFFAGE INFRASTRUCTURES, Velizy Villacoublay (FR)

( * ) Notice: Subject to any disclaimer, the term of this patent is extended or adjusted under 35 U.S.C. 154(b) by 255 days.

(21) Appl. No.: 14/649,384

(22) PCT Filed: Dec. 3, 2013

(86) PCT No.: PCT/FR2013/052922
§ 371 (c)(1),
(2) Date: Jun. 3, 2015

(87) PCT Pub. No.: WO2014/087091
PCT Pub. Date: Jun. 12, 2014

(65) Prior Publication Data
US 2015/0307713 A1    Oct. 29, 2015

(30) Foreign Application Priority Data
Dec. 5, 2012  (FR) ..................... 12 03304

(51) Int. Cl.
*C08L 95/00*  (2006.01)
*C08J 3/00*  (2006.01)
(Continued)

(52) U.S. Cl.
CPC ............... *C08L 95/00* (2013.01); *C08J 3/005* (2013.01); *C08J 3/126* (2013.01); *C08J 3/128* (2013.01);
(Continued)

(58) Field of Classification Search
CPC .. C08L 95/00; C08J 3/005; C08J 3/126; C08J 3/128; C08J 3/201; C08J 3/226
See application file for complete search history.

(56) References Cited

U.S. PATENT DOCUMENTS

| | | | |
|---|---|---|---|
| 4,081,502 A | 3/1978 | Blumel et al. | |
| 4,769,288 A * | 9/1988 | Saylak | C08K 3/06 106/274 |
| 4,837,252 A | 6/1989 | Seguin et al. | |
| 5,078,905 A | 1/1992 | Trinh et al. | |

(Continued)

FOREIGN PATENT DOCUMENTS

BE     1 002 939 A3     9/1991
CN    102 020 859 A     4/2011
(Continued)

OTHER PUBLICATIONS

International Search Report, dated Feb. 17, 2014, from corresponding PCT application.

*Primary Examiner* — John Uselding
(74) *Attorney, Agent, or Firm* — Young & Thompson

(57) ABSTRACT

Disclosed is a bituminous composition in the form of granules, each granule including a core and a coating and having a mass for approximately one hundred particles of from 0.5 g to 2 g, the core including from 40 wt. % to 60 wt. % of a binder matrix; from 30 wt. % to 40 wt. % of a polymer; from 4 wt. % to 6 wt. % of a compatibilizing agent; and from 2 wt. % to 15 wt. % of an anti-adhesive filler; and the coating including an anti-sticking agent. The invention relates also to a method for preparing the composition, and to the use thereof in bitumen plants.

20 Claims, 1 Drawing Sheet

(51) Int. Cl.
*C08J 3/12* (2006.01)
*C08J 3/20* (2006.01)
*C08J 3/22* (2006.01)

(52) U.S. Cl.
CPC ............... *C08J 3/201* (2013.01); *C08J 3/226* (2013.01); *C08J 2391/00* (2013.01); *C08J 2395/00* (2013.01); *C08J 2453/02* (2013.01); *C08J 2491/06* (2013.01)

(56) References Cited

U.S. PATENT DOCUMENTS

| | | |
|---|---|---|
| 5,256,712 A | 10/1993 | Langumier et al. |
| 8,435,599 B1 * | 5/2013 | Standeford ............ D06N 5/003 427/186 |
| 2005/0101701 A1 | 5/2005 | Stuart et al. |
| 2008/0015288 A1 | 1/2008 | Antoine et al. |
| 2008/0153945 A1 | 6/2008 | Prejean et al. |
| 2008/0200594 A1 | 8/2008 | Lopez |
| 2010/0273915 A1 | 10/2010 | Choen et al. |
| 2011/0257308 A1 | 10/2011 | Italia et al. |
| 2011/0269876 A1 | 11/2011 | Rowe et al. |
| 2011/0319533 A1 | 12/2011 | Gauthier et al. |
| 2013/0022737 A1 | 1/2013 | Krafft et al. |

FOREIGN PATENT DOCUMENTS

| | | |
|---|---|---|
| DE | 10 2010 035071 A1 | 2/2012 |
| FR | 2 871 804 A1 | 12/2005 |
| FR | 2 875 808 A1 | 3/2006 |
| FR | 2 918 066 A1 | 1/2009 |
| FR | 2 958 302 A1 | 10/2011 |
| WO | 2006/107179 A2 | 10/2006 |

* cited by examiner

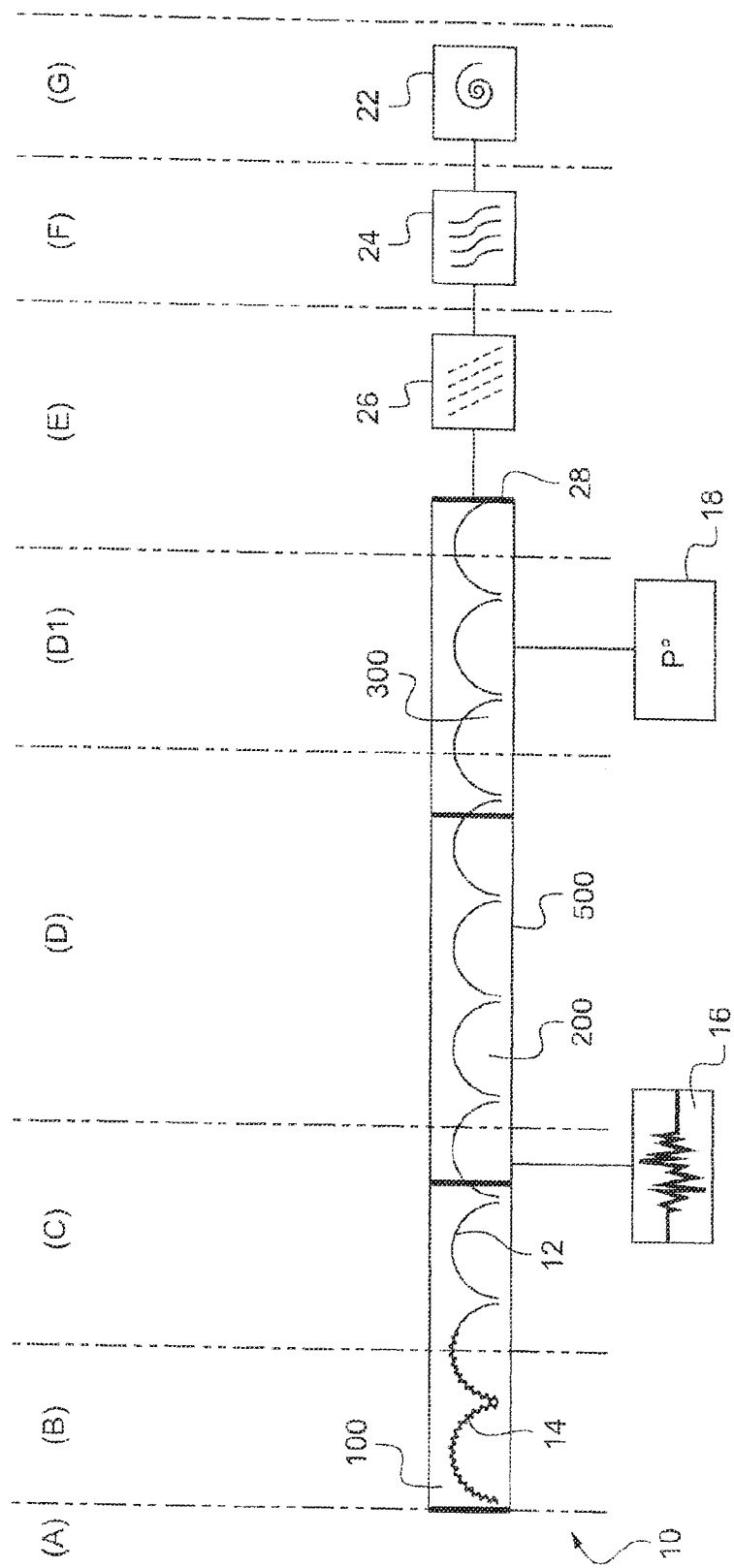

BITUMINOUS COMPOSITION IN THE FORM OF GRANULES AND METHOD FOR PREPARING SAME

BACKGROUND OF THE INVENTION

Field of the Invention

The present invention relates to a bituminous composition in the form of granules comprising a core and a coating. The invention relates also to a method for preparing said composition.

Bituminous compositions comprising a binder matrix are nowadays commonly used for producing anhydrous binders. These compositions are also used in emulsion form for road applications. In order to improve the physicochemical characteristics, the bituminous compositions comprising a binder matrix may especially coat polymers dispersed therein.

Generally, the preparation of such compositions is lengthy and is carried out in dedicated plants having mixing tanks arranged to receive the various components and additives forming the composition. The tanks can comprise agitating, grinding, dispersing and shearing tools or other elements which contribute to the maturation of the composition. Extruder-type devices are used and have the advantage of permitting a continuous preparation process in a short time. However, the use of extruders is sometimes associated with disadvantages, as will be seen below.

Depending on the desired composition, the preparation tools can include systems permitting the addition of crosslinker. The conditions in which crosslinking or dispersion takes place, where appropriate, can vary depending on the final composition that is desired. This can affect the rates of production and/or the preparation costs.

In addition, the use of certain additives can have a marked environmental impact. Moreover, the raw materials used and their physicochemical quality have a considerable impact on the physicochemical properties (including the thermomechanical performances) of the final composition. There is a constant need to monitor and standardize the raw materials that are used. Such monitoring is a lengthy and expensive process.

During the method for preparing the compositions, the quantities of energy are very considerable, in particular as regards the heating of kneading tanks, which can sometimes contain a large quantity of components. Heating as such must also be monitored so that the thermomechanical performances of the final composition are not impaired.

It is also very important for the bituminous compositions to have good storage characteristics (especially homogeneity).

Description of Related Art

Document FR 2 871804 proposes a method for preparing a mixture comprising bitumen and at least one polymer in an extruder at variable temperature.

It has been shown that the particle size of the polymer plays a vital role in the preparation of bituminous compositions. The finer the particle size of the polymer, the higher the dispersion rate thereof in the bitumen. However, the cost of conditioning the polymers in powder form is all the higher, the smaller the size of the particles of said powder. Moreover, such conditioning presents certain risks and requires that expensive safety measures be put in place.

In addition, attempts have been made to mix the polymer in liquid form with the binder matrix of the bituminous composition, which results in a very short kneading time and an almost instantaneous mixture. However, the energy necessary for liquefying the polymer is very considerable and the time required is long. Also, this phase is carried out at temperatures which can cause degradation of the polymer.

Generally, the use of extruders for preparing binder matrix compositions requires very precise operating conditions. There is therefore a constant need to improve the preparation methods in order to remedy the disadvantages mentioned above. Very particularly, there is a need to limit the costs, to have freedom of choice over the starting material and especially to provide a composition. Stability over time is understood as meaning especially the possibility of storage for prolonged periods and at ambient temperature.

The present invention will improve the situation.

BRIEF SUMMARY OF THE INVENTION

To that end, the invention proposes a method for preparing granules comprising a binder matrix composition, comprising the following steps:
a. providing from 40 wt. % to 60 wt. % of a binder matrix, from 30 wt. % to 40 wt. % of a polymer, from 4 wt. % to 6 wt. % of a compatibilizing agent, and from 3 wt. % to 15 wt. % of an anti-adhesive filler;
b. micronizing the polymer in the presence of the compatibilizing agent to form a preparation comprising micronized polymer having polymer particles with a diameter of from 250 μm to 1000 μm, preferably from 400 μm to 600 μm;
c. adding the binder matrix to said preparation comprising micronized polymer obtained in step b. to form a mixture comprising binder matrix;
d. adding the anti-adhesive filler to said mixture comprising binder matrix obtained in step c. to form a core;
e. formulating the core obtained in step d. to a pre-granulated product;
f. drying the pre-granulated product;
g. coating the pre-granulated product with an anti-sticking agent;
wherein step b. is carried out at a temperature of less than or equal to 60° C., and steps c. and d. are carried out at a temperature of from 130° C. to 200° C.

According to one embodiment, step e. includes pressurization of from 2000 kPa to 7000 kPa.

The polymer is preferably styrene-butadiene-styrene (SBS) copolymer.

Step d. can further include the addition of from 1 wt. % to 5 wt. % of a crosslinking agent. According to one embodiment of the invention, step d. can further include the addition of from 1 wt. % to 5 wt. % of a crosslinking agent Retiflex.

The compatibilizing agent is preferably chosen from the group composed of a wax based on a mixture of fatty acid derivatives, a paraffin wax, a wax of vegetable origin, a wax of animal origin, or a mixture thereof.

The binder matrix can be chosen from the group composed of bitumen of grade 35/50, bitumen of grade 50/70, bitumen of grade 70/100, bitumen of grade 160/220, tall-oil pitch or derivatives thereof, a mixture of fatty acids or derivatives thereof, an oil of vegetable origin, an oil of animal origin, a colophony derivative, a methyl ester of a vegetable oil, or a mixture thereof.

The anti-adhesive filler can be chosen from the group composed of talc, zinc stearate, calcium stearate, magnesium stearate, polyethylene powder, polyethylene wax, ground silica, carbon black, or a mixture thereof.

Step e. can include shearing of said core in order to obtain a pre-granulated product formed by particles. In this embodiment, the particles obtained have a mass for approximately one hundred particles of from 0.4 g to 0.9 g.

The polymer provided in step a. can be in the form of grains having a size of from 1 mm to 10 mm. The polymer provided in step a. is preferably in the form of grains having a size of from 1 mm to 5 mm.

The invention relates also to a bituminous composition in the form of granules, each granule comprising a core and a coating and having a mass for approximately one hundred particles of from 0.6 g to 1.0 g, the core comprising:

from 40 wt. % to 60 wt. % of a binder matrix;
from 30 wt. % to 40 wt. % of a polymer;
from 4 wt. % to 6 wt. % of a compatibilizing agent; and
from 3 wt. % to 15 wt. % of an anti-adhesive filler;

and the coating comprising an anti-sticking agent.

In this composition, the binder matrix can be chosen from the group composed of bitumen of grade 35/50, bitumen of grade 50/70, bitumen of grade 70/100, bitumen of grade 160/220, tall-oil pitch or derivatives thereof, a mixture of fatty acids or derivatives thereof, an oil of vegetable origin, an oil of animal origin, a colophony derivative, a methyl ester of a vegetable oil, or a mixture thereof. The polymer can be styrene-butadiene-styrene (SBS) copolymer. The compatibilizing agent is preferably chosen from the group composed of a wax based on a mixture of fatty acid derivatives, a paraffin wax, a wax of vegetable origin, a wax of animal origin, or a mixture thereof. The mixtures of fatty acids are particularly preferred in the composition of the invention. The anti-adhesive filler of the core can be chosen from the group composed of talc, zinc stearate, calcium stearate, magnesium stearate, polyethylene powder, polyethylene wax, ground silica, carbon black, or a mixture thereof. The anti-sticking agent of the coating can be chosen from the group composed of talc, zinc stearate, calcium stearate, magnesium stearate and polyethylene powder.

The core of the composition of the invention can further comprise from 1 wt. % to 5 wt. % of a crosslinking agent.

The invention additionally relates to a use of the bituminous composition as described above in road applications, on the one hand, and for the manufacture of a bituminous mixture comprising gravel, on the other hand.

The composition according to the invention can be introduced directly into kneaders of coating units. When the composition comprises a crosslinking agent, it is generally intended to be mixed with bitumen in a plant for producing polymer modified binders. The invention relates to a use of the composition of the invention in a binder plant.

Finally, the invention relates also to a device comprising a twin-screw extruder having an intake section, an intermediate section and a discharge section, said intake section being arranged to receive at least the elements of the group composed of a polymer and a compatibilizing agent, said intermediate section being arranged to receive at least a binder matrix, and said outlet section being arranged to receive at least an anti-adhesive filler and, where appropriate, a crosslinking agent; a micronization tool disposed in the intake section for micronizing said polymer in the presence of the compatibilizing agent and forming a preparation comprising micronized polymer having polymer particles with a diameter of less than or equal to 500 μm; a mixing tool disposed in each section for mixing the elements received by the intake section, the intermediate section and the discharge section, respectively, and forming a core in the discharge section; a temperature regulator which cooperates with each section in order to maintain a temperature of less than or equal to 60° C. in said intake section and in order to maintain a temperature of from 130° C. to 200° C. in said intermediate and terminal sections; a compressor which cooperates at least with the discharge section of the extruder in order to pressurize that section at a pressure of from 2000 kPa to 7000 kPa; a granulation chamber comprising a shear tool which is disposed adjacent to said discharge section and is arranged to cut said core in order to obtain a pre-granulated product formed by particles having a mass for approximately one hundred particles of from 0.4 g to 0.9 g; a drying tool for drying said pre-granulated product; and a coating chamber for coating said pre-granulated product with an anti-sticking agent and thus forming a granulated composition comprising granules having a mass for approximately one hundred particles of from 0.5 g to 1 g.

BRIEF DESCRIPTION OF THE DRAWINGS

Other advantages and features of the invention will become apparent upon reading the detailed description below and from the accompanying drawing, in which:

The sole drawing figure shows a diagram of a device according to the invention and the steps of the method for preparing granules comprising a binder matrix composition.

DETAILED DESCRIPTION OF THE INVENTION

The drawing and the description below mainly contain elements of a specific nature. They form an integral part of the description and may therefore not only serve for better understanding of the invention but also contribute towards the definition thereof, where appropriate.

The preparation of granules comprising a binder matrix composition, such as polymer modified asphalt, can be carried out in extruder-type devices.

The present invention relates especially to a method for preparing granules comprising a binder matrix composition. The final composition comprises inter alia a binder matrix (bitumen) and at least one polymer. The method is carried out in an extruder-type device.

Extruder-type devices offer a treatment which allows a pasty mass to be sheared and transported through one or more suitable orifices in order to obtain a final product in the form of granules. The operation of an extruder is accompanied by phases of grinding, kneading and transport of the material, which effect homogenization of the mixture of binder matrix, polymer and the remainder of the components forming the final product, which are conventionally introduced separately into the extruder. In order to effect agitation, the extruder comprises a mixing member which can be formed by one or more screws of the Archimedes' screw type.

There are extruders called twin-screw extruders, which comprise at least two screws. These screws are able to rotate in the same direction or in opposite directions. Current extruders thus allow a mixture to be formed in several tens of seconds. In order to optimize the mixing operations (agitation/kneading efficiency, etc.), it is possible to vary and adapt the screw profiles, the temperature, the speed of rotation, the flow rates of the components.

The use of an extruder presents several advantages and especially the possibility of varying the working temperature along the barrel in which the extruder screw is situated. Depending on the chemical components introduced into the extruder, the possibility of being able to regulate and vary the temperature in the different sections of the extruder plays an essential role in determining the physicochemical characteristics of the final product. Thus, the dispersing time of the polymer can be reduced to a few seconds, which limits its exposure to high temperatures and thus avoids degradation of its performance.

For example, it has been found that a working temperature greater than 160° C. can be found to be preferable when the trisequence copolymer styrene-butadiene-styrene (SBS) is used as the polymer, in order to ensure softening thereof, its good dispersion and its swelling in the oils and resins of the bitumen. That temperature is then applied in the chosen sections of the mixing/kneading extruder. In other sections, lowering the temperature may assist in cooling the final product to the ambient storage temperature.

Extruders allow a masterbatch to be formed. The masterbatch can be composed of different chemical components which have, where appropriate, very different physicochemical properties. Temperature regulation is therefore an essential and critical factor in the preparation of products intended for specific applications.

Another advantage is that an extruder comprises a group of elements which are arranged to work in synergy with one another, and that those elements can be adapted according to requirements. Accordingly, the extruder can have specific screws provided with tools forming, for example, particular mixers/kneaders.

The prior art teaches that, the more finely dispersed the polymer, the shorter the stirring time. The prior art also teaches that a polymer in liquid form results in a very short agitating/kneading time.

However, the cost of conditioning polymers in powder form is higher, the smaller the size of the particles of said powder; while the energy necessary for liquefying the polymer is very considerable and the necessary time is long.

In addition, polymers in the form of powder pose health problems for the operating personnel (inhalation of fine particles, risk of self-ignition or explosion, etc.). The applicant has analysed polymers in the liquid state and has been able to identify disadvantages which make them generally unusable. Among those disadvantages, particular mention may be made of increased rigidity associated with potential oxidation resulting from their exposure to high temperatures (close to 200° C.).

The applicant has developed a method and a micronization tool which optimize the physicochemical characteristics of the final product. Implementation of the method and the micronization tool limit the disadvantages of the prior art associated with the use of a polymer powder or of a polymer in liquid form. In addition, the applicant has identified working temperatures and a protocol for production by extrusion which allow:
  the physicochemical characteristics of the final product to be improved (especially in terms of storage stability);
  the SBS polymer to be micronized to granules in an extruder;
  the dispersion and swelling of the SBS polymer in a binder matrix to be optimized;
  granules (of masterbatch) which can be stored at ambient temperature to be obtained.

This has led to a binder matrix composition having physicochemical characteristics which are optimized as compared with those known in the prior art. In addition, the method of the invention is more economical in terms of costs and energy than the known methods.

An advantage of the invention is especially the possibility of adding the polymer in crude form such as in the form of grains. The polymer in that form is widely available commercially, is economical, is simple to store and does not require pretreatment.

A micronization tool is disposed at the start of the extruder, which allows the crude polymer to be micronized to particles having a diameter of from 250 µm to 1000 µm, preferably from 400 µm to 600 µm. The micronization is carried out in the presence of a compatibilizing agent. The presence of the compatibilizing agent reduces the energy of friction during the micronization and thus limits the self-heating of the polymer. Advantageously, the temperature during the micronization is adjusted to a temperature less than or equal to 60° C. Deterioration of the polymer (especially by oxidation) is thus avoided, and the physicochemical characteristics of the final product are thus improved.

In other embodiments, the polymer can be micronized upstream of its introduction into the extruder.

Another particular feature of the present invention is the combination in the final product of an anti-adhesive filler and an anti-sticking agent. The anti-adhesive filler is contained in the core of the final product, while the anti-sticking agent coats the core. The synergy between those two components increases the storage stability of the final product especially.

On the other hand, the applicant has found, surprisingly, that pressurization of an extruder by active regulation allowed the mass and diameter of the particles forming the final product to be controlled.

A cutting (or shearing) tool disposed in the discharge section of the extruder in theory allows a pasty composition to be granulated to form particles of a chosen size. However, the progress of the pasty composition through the shearing tool is not always even owing especially to possible viscosity variations or to air voids within the pasty composition. Pressurization allows the progress actively to be controlled and thus allows the cutting of the pasty composition by the shearing tool to be controlled and standardized.

Thus, according to one embodiment of the invention, steps b. to d. of the method of the invention described above can be carried out in an extruder under a pressure of from 2000 kPa to 7000 kPa, preferably from 3000 kPa to 6000 kPa. According to a particular embodiment, the pressure is from 5500 kPa to 5700 kPa. Consequently, the particles of the final product have a mass for approximately one hundred particles of from 0.4 g to 0.9 g.

The drawing figure shows a device of the invention 10. The device 10 comprises an extruder 500 of the twin screw type, an air or underwater granulation chamber 26, a drying tool 20 and a coating chamber 22.

Parallel to the device 10, the drawing figure shows the operations of the method of the invention according to a particular embodiment.

The extruder 500 has an intake section 100, an intermediate section 200 and a discharge section 300. Each section 100, 200, 300 is arranged to receive the components forming the binder matrix composition according to the invention.

Before the various chemical components of the binder matrix composition of the invention are introduced into the extruder, the method of the invention provides that the components are made available. In the embodiment described here, the components are made available by an operation A which consists in providing from 40 wt. % to 60 wt. % of a binder matrix, from 30 wt. % to 40 wt. % of a polymer, from 4 wt. % to 6 wt. % of a compatibilizing agent, and from 3 wt. % to 15 wt. % of an anti-adhesive filler (and, where appropriate, from 1 wt. % to 15 wt. % of a cross-linking agent).

The polymer is preferably styrene-butadiene-styrene (SBS) copolymer.

The compatibilizing agent is chosen from the group composed of a wax based on a mixture of fatty acid derivatives, a paraffin wax, a wax of vegetable origin, a wax of animal origin, or a mixture thereof.

The binder matrix can be chosen from the group composed of bitumen of grade 35/50, bitumen of grade 50/70, bitumen of grade 70/100, bitumen of grade 160/220, tall-oil pitch or derivatives thereof, a mixture of fatty acids or derivatives thereof, an oil of vegetable origin, an oil of animal origin, a colophony derivative, a methyl ester of a vegetable oil, or a mixture thereof.

The anti-adhesive filler can be chosen from the group composed of talc, zinc stearate, calcium stearate, magnesium stearate, polyethylene powder, polyethylene wax, ground silica, carbon black, or a mixture thereof.

The intake section 100 can receive at least the polymer and the compatibilizing agent. The intermediate section 200 can receive at least the binder matrix, and the discharge section 300 can receive at least the anti-adhesive filler and, where appropriate, a crosslinking agent.

The drawing figure also shows a mixing tool 12 disposed in each section of the extruder 500. In the present embodiment, the mixing tool 12 comprises a twin screw. In the intake section 100, the mixing tool 12 cooperates with a micronization tool 14. The micronization tool allows grains of polymer introduced in the crude state into the extruder to be micronized in the intake section 100. The micronization is carried out in the presence of a compatibilizing agent and with temperature control as described below.

Accordingly, the method of the invention provides an operation B which here consists in micronizing the polymer in the presence of the compatibilizing agent to form a preparation comprising micronized polymer having polymer particles with a diameter of less than or equal to 500 µm.

The use of the micronization tool 14 offers the possibility of introducing the polymer directly in crude form, that is to say in the form of grains. As described above, the prior art involves at least one additional step for conditioning the polymer before it is introduced into the extruder. This step essentially comprises converting the polymer into a powder. The invention allows this conditioning step to be omitted, by virtue of the micronization tool 14 disposed in the intake section of the extruder 500.

In order to assist with the micronization of the polymer, the invention proposes the introduction in parallel of the compatibilizing agent. Micronization of the polymer in the presence of the compatibilizing agent can be carried out under a controlled temperature at a temperature of less than or equal to 60° C. This avoids deterioration of the polymer (for example oxidation thereof) and increases the quality of the final product. The compatibilizing agent contributes towards regulating the temperature during the micronization of the polymer. It essentially lowers the energy of friction that occurs during said micronization. In addition, the fact that the operation is carried out at a temperature of less than or equal to 60° C. allows the elastomeric properties of the SBS polymer to be retained. This all results in a final product having good physicochemical performances.

For greater control of the temperature within the device 10 of the invention, the device comprises a temperature regulator 16. The temperature regulator 16 is arranged to act on each part of the device 10 of the invention. The embodiment of the drawing figure shows a direct connection between the temperature regulator 16 and the extruder 500. However, it will be appreciated that the regulator can act on each part of the device and especially on the temperature of the air or of the water in the granulation chamber 26.

The temperature regulator 16 allows the temperature to be controlled continuously along the extruder 500. Each step of the preparation method of the invention is thus optimized substantially at a chosen temperature. Accordingly, the temperature prevailing in the intake section 100 can be different from the temperature prevailing in the intermediate section 200, which in turn is different from the temperature prevailing in the discharge section 300. The temperature regulator 16 can be composed of heating resistors, on the one hand, and a water circuit, on the other hand. Sensors disposed in the device 10 allow the temperature regulator 16 to detect the temperature and adjust it upwards or downwards if necessary. For example, if there is a risk that a predetermined threshold temperature (such as the temperature of 60° C. during operation B) will be exceeded, the regulator 16 cools the system.

It must be noted that the combination of the introduction of a compatibilizing agent together with the polymer and maintenance at a chosen temperature by means of the temperature regulator 16 ultimately allows a uniform polymer to be produced, which assists with the dispersion of the binder matrix which will be added in a subsequent step. This results in stability and uniformity of the final product.

It should therefore be noted that the micronization of the polymer within the device 10 is controlled on the one hand by the addition in parallel of a compatibilizing agent and on the other hand by the temperature regulation.

After the preparation comprising micronized polymer having polymer particles with a diameter of less than or equal to 500 µm has been obtained by the micronization operation B, there follows an operation C, which consists in adding the binder matrix to said preparation comprising micronized polymer. Operation C is preferably carried out at a temperature of 180° C.

Operation C of adding binder matrix is followed by an operation D, which consists in adding the anti-adhesive filler to the mixture comprising binder matrix. A core is thus formed. It will be appreciated that the core is here in the form of a pasty composition. In the remainder of the method, the core will be conditioned to a pre-granulated product as described below. Operation D is preferably carried out at a temperature of 140° C.

Optionally, operation D can include an operation D1, which consists in further adding from 1 wt. % to 5 wt. % of crosslinking agent.

The addition operations C, D and D1 are carried out in the conventional manner. They involve adding chemical components to the extruder 500. Each addition can be carried out into a chosen section (intake section 100, intermediate section 200 or discharge section 300 of the extruder 500).

Operation E which follows consists in formulating said core (still in the form of a pasty composition) to a pre-granulated product. This is a granulation operation.

Adjacent to the discharge section 300 there are disposed a die 28 and then a granulation chamber 26. In other embodiments, not shown here, the granulation chamber 26 can be disposed in the extruder 500.

The die 28 allows the composition in paste form to be converted into a composition in the form of threads or strands.

The granulation chamber 26 comprises a shearing tool (or cutting tool) which allows the pasty composition (core) to be granulated into particles of chosen mass and/or size.

For controlling the granulation operation E within the device 10 of the invention, the device comprises a compressor 18. The compressor 18 is arranged to act on each part of the device 10 of the invention. The embodiment of the drawing figure shows a direct connection between the temperature regulator 16 and the extruder 500. However, it will be appreciated that the compressor 18 can act on each part of the device and more particularly on the die 28 which allows the bituminous composition to be converted into even threads or strands with constant viscosities.

The compressor 18 allows the progress of the pasty composition along the extruder 500, and more particularly in the die 28 and then the granulation chamber 26, actively to be controlled. According to a preferred embodiment, the pressure in the die is regulated at approximately 5000 kPa and 6000 kPa. The shearing tool can thus operate precisely in order to standardize the cutting of the pasty composition and provide particles having a mass for approximately one hundred particles of from 0.4 g to 0.9 g. The particles form the pre-granulated product.

In other words, operation E can be regarded as formulation by controlled granulation.

The granulation chamber 26 generally comprises a cooling water inlet for cooling the freshly cut particles. Consequently, the pre-granulated product must be dried before final coating. Drying is carried out by means of a drying tool 24, which generally comprises a thermoregulated air-blowing device.

Accordingly, the drawing figure shows a drying tool 24 for carrying out an operation F, which consists in drying the pre-granulated product obtained in operation E.

After drying, the method of the invention comprises an operation G, which consists in coating the pre-granulated product with an anti-sticking agent. To that end, the device 10 of the invention comprises a coating chamber 22.

According to one embodiment of the invention, the anti-sticking agent is chosen from the group composed of talc, zinc stearate, calcium stearate, magnesium stearate and polyethylene powder.

It should be noted that the anti-adhesive filler contained in the core and the anti-sticking agent which coats the core can be of a similar or even identical chemical nature. However, according to the invention, their final function is different. Accordingly, the applicant has found, surprisingly, that the combination of the anti-adhesive filler and the anti-sticking agent exhibits a synergy effect which results in high stability of the final product.

After the pre-granulated product has been coated with the anti-sticking agent under the conditions described in the present description, the granules comprising a binder matrix composition according to the invention are obtained. The granules comprising a binder matrix composition according to the invention have good physicochemical characteristics and exhibit high storage stability over time at temperatures up to 60° C.

It will be appreciated that the temperature regulator 16 and the compressor 18 are arranged to be able to act on the device 10 as a whole. Accordingly, the invention provides substantial control of each operation. According to the invention, the temperature regulator cooperates with the intake section 100 to maintain a temperature of less than or equal to 60° C. therein, and it also cooperates with the intermediate section 200 and the terminal section 300 to maintain a temperature of from 130° C. to 200° C. therein. The compressor 18 is regulated to pressurize each section of the extruder 10 at a pressure of from 300 kPa to 7000 kPa. A controlled pressure is ensured in particular in the die before the pasty composition is cut by the granulation tool to formulate said pasty composition into the pre-granulated product. A controlled pressure allows granules of a predetermined mass and size to be obtained.

The profile of the mixing tool 12, that is to say, for example, the screw profile in the intake section 100, is chosen specifically according to the application. Thus, the screw profile can constitute the micronization tool 14. In other sections of the extruder, the operator will be able to adapt the screw profile or combine it with other elements as required and according to common practice in the art.

The invention will be described below by means of implementation examples which are given without implying any limitation.

IMPLEMENTATION EXAMPLES

In the examples, percentages are by weight.

The applicant prepared different variants of granules comprising a binder matrix composition according to the invention. Each preparation was produced by a method according to the invention and under the conditions described in the general description above.

Tables 1 to 6 contain the compositions of cores according to the invention. Tables 4 to 6 show embodiments in which each core comprises a crosslinking agent, namely Retiflex.

TABLE 1

Composition 1 of core of granules comprising binding matrix composition

| Products | Contents by weight |
|---|---|
| Binder matrix: bitumen 70/100 | 45% |
| Polymer: SBS | 40% |
| Compatibilizing agent | 5% |
| Anti-adhesive filler: talc | 10% |

TABLE 2

Composition 2 of core of granules comprising binding matrix composition

| Products | Contents by weight |
|---|---|
| Binder matrix: 70/100 | 57% |
| Polymer: SBS | 35% |
| Compatibilizing agent | 5% |
| Anti-adhesive filler: zinc stearate | 3% |

TABLE 3

Composition 3 of core of granules comprising binding matrix composition

| Products | Contents by weight |
|---|---|
| Binder matrix: bitumen 70/100 | 55% |
| Polymer: SBS | 30% |
| Compatibilizing agent | 5% |
| Anti-adhesive filler: talc | 10% |

TABLE 4

Composition 4 of core of granules comprising binding matrix composition

| Products | Contents by weight |
|---|---|
| Binder matrix: bitumen 70/100 | 50.4% |
| Polymer: SBS | 40% |
| Compatibilizing agent | 5% |
| Anti-adhesive filler: zinc stearate | 3% |
| Crosslinking/vulcanizing agent | 1.6% |

TABLE 5

Composition 5 of core of granules comprising binding matrix composition

| Products | Contents by weight |
|---|---|
| Binder matrix: bitumen 70/100 | 43.4% |
| Polymer: SBS | 40% |
| Compatibilizing agent | 5% |
| Anti-adhesive filler: talc | 10% |
| Crosslinking/vulcanizing agent | 1.6% |

TABLE 6

Composition 6 of core of granules comprising binding matrix composition

| Products | Contents by weight |
|---|---|
| Binder matrix: bitumen 70/100 | 42% |
| Polymer: SBS | 40% |
| Compatibilizing agent | 5% |
| Anti-adhesive filler: talc | 10% |
| Crosslinking/vulcanizing agent | 3% |

Each core composition was coated with an anti-sticking agent under the conditions described in relation to operation G.

The compatibilizing agent is a mixture of fatty acid derivatives, namely the wax Licomont (registered trademark) BS 100.

The composition examples use a bitumen 70/100 and a star-shaped SBS marketed by VERSALIS under the name SOL T 6205 G.

The crosslinking/vulcanizing agent is obtained by Eiffage Travux Publics under the name Retiflex.

Comparative Example 1

Table 7 shows a comparative example between bitumen 70/100 mixed with the granules of the invention and bitumen 70/100 (core of composition 4; see Table 4 above) produced in the conventional manner complying with the required specifications. Table 7 also summarizes the results of tests in accordance with the chosen standards.

TABLE 7

Comparative example 1

| | Bitumen/polymer modified with granules according to composition 4 | Bitumen/polymer produced in the conventional manner in a plant (powder polymer dispersed in bitumen) according to the required specifications |
|---|---|---|
| Bitumen 70/100 | 90% | 95.4% |
| Granules according to composition 4 (see Table 4) | 10% | — |
| Polymer: SBS | — | 4% |
| Crosslinking agent | — | 0.6% |
| Production time to obtain complete dispersion of the polymer and crosslinking thereof | 1½ h | 2 h |
| *Results* | | |
| Penetrability at 25° C. (1/10° mm) (according to NF EN 1427) | 59 | 40 to 70 |
| Ball and ring temperature (° C.) (according to NF EN 1426 | 82 | >65 |
| Brookfield viscosity cylinder B 160° C. (mPa · s) (non-standardized method) | 358 | approximately 550 |
| Elastic recovery (%) (according to NF EN 13 398) | 98 | >85 |
| Fraass breaking point (° C.) (according to NF EN 12 593) | −12 | approximately-15 |
| SBS dosage by infra-red spectrometry (non-standardized method) | 4.2 | 4 |
| Storability 3 days at 180° C. (according to NF EN 13 399) | 100 | >90 |
| *Tensile properties at 0° C. and 100 mm (according to NF EN 13 589)* | | |
| Elongation threshold (%) | 9 | 8 |
| Strain (Mpa) | 3.3 | 2.7 |
| Elongation at break (%) | 739 | >440 |
| Strain (Mpa) | 1.6 | 1.4 |
| Energy (J/cm2) | 25 | >15 |

The bitumen modified with granules according to Example 4 meets the required specifications.

Comparative Example 2

Table 8 shows a comparative example between an asphalt obtained from a bitumen/polymer composition produced in the conventional manner in a laboratory (mixture 1) and an asphalt obtained from a bitumen/polymer composition comprising granules obtained from composition 1 (mixture 2) according to the invention (core of composition 1; see Table 1 above). Table 8 also summarizes the results of tests according to chosen standards.

Mixture 1 of Table 8 was obtained by adding to the granules and filler (also called fines) preheated to 180° C. a bitumen/polymer composition comprising 5% uncrosslinked SBS polymer, dispersed in a bitumen of type 70/100 (produced in the conventional manner in a laboratory). The bitumen/polymer composition was brought to a temperature of 180° C. before being introduced into the granules.

Mixture 2 was obtained by adding granules according to composition 1 (introduction at ambient temperature) to the granules preheated to 180° C. A pure bitumen (addition bitumen) of type 70/100, preheated to 140° C., was then added so as to obtain an asphalt having binder and polymer contents identical to those of mixture 1.

TABLE 8

Comparative example 2

|  | Mixture 1 | Mixture 2 |
|---|---|---|
| Gravel 10/14 | 18.63% | 18.63% |
| Gravel 6/10 | 20.00% | 20.00% |
| Gravel 2/6 | 18.00% | 18.00% |
| Sand 0/2 | 17.00% | 17.00% |
| Limestone filler | 2.30% | 2.30% |
| Recycled asphalt aggregates 0/10 | 20.00% | 20.00% |
| Bitumen/polymer (conventional production in the laboratory) | 4.07% | — |
| Addition bitumen 70/100 | — | 3.41% |
| Granules according to composition 1 | — | 0.66% |
| Total content of bitumen/polymer | 5.00% | 5.00% |
| Richness modulus K | 3.29 | 3.28 |
| Maximum density - volumetric method (according to NF EN 12 697-5) | | |
| $\rho_{mv}$ (Mg/m$^3$) | 2.501 | 2.498 |
| Gyratory shear press test (according to NF EN 12 697-31) | | |
| V(%) at 10 gyrations | 16.0 | 14.3 |
| V(%) at 80 gyrations | 7.8 | 6.1 |
| V(%) at 200 gyrations | 4.8 | 3.3 |
| Straight line slope | −3.686 | −3.611 |
| Water sensitivity test (according to NF EN 12 697-12) | | |
| Void content (%) | 6.1 | 5.7 |
| $C_d$ (KPa) | 10 600 | 10 700 |
| $C_w$ (KPa) | 10 100 | 9800 |
| i/C | 95 | 92 |
| Rutting test (according to EN 12 697-22 + A1) | | |
| Void content (%) | 5.8% | 5.0% |
| Thickness of the test pieces | 10.4 cm | 10.2 cm |
| Test temperature | 60.6° C. | 60.0° C. |
| Rut depth after: | | |
| 1000 cycles | 1.6% | 1.9% |
| 3000 cycles | 1.9% | 2.2% |
| 10 000 cycles | 2.1% | 2.5% |
| 30 000 cycles | 2.3% | 2.7% |
| Direct tensile modulus of rigidity (according to NF EN 12 697-26) | | |
| Void content (%) | 5.6 | 5.2 |
| Modulus of rigidity 15° C. and 0.02 s (MPa) | 9900 | 10 700 |

The asphalt produced with a bitumen modified with SBS polymer on the basis of granules according to composition 1 meets the required specifications.

Comparative Example 3

Eight compositions of granules containing variable amounts of bitumen, of SBS polymer and of anti-adhesive fillers were evaluated in terms of storage stability. All the granules, with the exception of the composition called control 2, were coated with talc after granulation and drying, in an amount of 5% by mass.

All the granule compositions were packaged after production, either in conventional large bags called big bags (content approximately 600 kg) or in conventional small plastics bags (content 10 kg) packaged on a pallet of 600 kg. The storage stability over 9 months was evaluated. During those 9 months, the temperatures varied from −10° C. to +60° C.

The results of the observations made during storage are presented in Table 9.

TABLE 9

Storage stability

| Composition | Observations after 9 months' storage |
|---|---|
| Control 1 (with coating): | |
| 40% SBS<br>0% anti-adhesive filler<br>5% compatibilizing agent<br>55% bitumen 70/100 | Total and immediate clogging from the very start of packaging |
| Control 2 (without coating): | |
| 40% SBS<br>10% talc<br>5% compatibilizing agent<br>45% bitumen 70/100 | Partial clogging of the granules 4 months after packaging |
| Composition stockA (with coating): | |
| 25% SBS<br>10% CaCO$_3$<br>5% compatibilizing agent<br>60% bitumen 70/100 | Total clogging of the granules 2 weeks after production |
| Composition stockB (with coating): | |
| 25% SBS<br>5% CaCO$_3$<br>5% compatibilizing agent<br>65% bitumen 70/100 | Total clogging of the granules 1 month after production |
| Composition stockC (with coating): | |
| 35% SBS<br>3% zinc stearate<br>5% compatibilizing agent<br>57% bitumen 70/100 | No clogging in the bags |
| Composition stockD (with coating): | |
| 30% SBS<br>10% talc<br>5% compatibilizing agent<br>55% bitumen 70/100 | |
| Composition stockE (with coating): | |
| 40% SBS<br>3% zinc stearate<br>5% compatibilizing agent<br>52% bitumen 70/100 | |
| Composition stockF (with coating): | |
| 40% SBS<br>10% talc<br>5% compatibilizing agent<br>45% bitumen 70/100 | |

It will be noted that the compositions according to the invention (polymer content of at least 30%, namely compositions stockC, stockD, stockE and stockF) show good storage stability.

The invention allows asphalts comprising bitumen modified with SBS polymer to be produced directly in the kneaders of the coating units. The performances are at least identical to those of asphalts produced from bitumens/SBS polymers prepared in the conventional manner in binder plants. In addition, the products produced on the basis of the invention permit easy storage (and thus easy transportation, etc.). Consequently, the storage and transport costs are significantly lower than those of the products comprising bitumen/polymer of the prior art (products which require warm storage in liquid form). This all leads directly to a reduction in energy consumption. The stability of the product further permits simple export of the product.

The composition of the invention can accordingly be used as a base for the production of a bituminous mixture comprising natural or synthetic granules, filler, and recycled materials.

The invention claimed is:

1. A method for preparing granules comprising a binder matrix composition, comprising the following steps:
   a. providing from 40 wt. % to 60 wt. % of a binder matrix, from 30 wt. % to 40 wt. % of a polymer, from 4 wt. % to 6 wt. % of a compatibilizing agent, and from 3 wt. % to 15 wt. % of an anti-adhesive filler;
   b. micronizing the polymer in the presence of the compatibilizing agent to form a preparation comprising micronized polymer having polymer particles with a diameter of from 250 µm to 1000 µm;
   c. adding the binder matrix to said preparation comprising micronized polymer obtained in step b. to form a mixture comprising binder matrix;
   d. adding the anti-adhesive filler to said mixture comprising binder matrix obtained in step c. to form a core;
   e. formulating the core obtained in step d. to a pre-granulated product;
   f. drying the pre-granulated product;
   g. coating the pre-granulated product with an anti-sticking agent;
   wherein step b. is carried out at a temperature of less than or equal to 60° C., and steps c. and d. are carried out at a temperature of from 130° C. to 200° C.

2. The method according to claim 1, wherein step e. includes pressurization of from 2000 kPa to 7000 kPa.

3. The method according to claim 1, wherein the polymer is a styrene-butadiene-styrene (SBS) copolymer.

4. The method according to claim 1, wherein step d. further includes the addition of from 1 wt. % to 5 wt. % of a crosslinking agent.

5. The method according to claim 1, wherein the compatibilizing agent is chosen from the group composed of a wax based on a mixture of fatty acid derivatives, a paraffin wax, a wax of vegetable origin, a wax of animal origin, or a mixture thereof.

6. The method according to claim 1, wherein the binder matrix is chosen from the group composed of bitumen of grade 35/50, bitumen of grade 50/70, bitumen of grade 70/100, bitumen of grade 160/220, tall-oil pitch or derivatives thereof, a mixture of fatty acids or derivatives thereof, an oil of vegetable origin, an oil of animal origin, a colophony derivative, a methyl ester of a vegetable oil, or a mixture thereof.

7. The method according to claim 1, wherein the anti-adhesive filler is chosen from the group composed of talc, zinc stearate, calcium stearate, magnesium stearate, polyethylene powder, polyethylene wax, ground silica, carbon black, or a mixture thereof.

8. The method according to claim 1, wherein step e. includes shearing of said core in order to obtain a pre-granulated product formed by particles, said particles having a mass for approximately one hundred particles of from 0.6 g to 0.8 g.

9. The method according to claim 1, wherein the polymer provided in step a. is in the form of grains having a size of from 1 mm to 10 mm.

10. A binder matrix composition in the form of granules, each granule comprising a core and a coating and having a mass for approximately one hundred particles of from 0.5 g to 2 g, the core comprising:
    from 40 wt. % to 60 wt. % of a binder matrix;
    from 30 wt. % to 40 wt. % of a polymer;
    from 4 wt. % to 6 wt. % of a compatibilizing agent; and
    from 2 wt. % to 15 wt. % of an anti-adhesive filler;
    and the coating comprising an anti-sticking agent.

11. The composition according to claim 10, wherein the core further comprises from 1% to 5% of a crosslinking agent.

12. A coating unit that is constructed and arranged to utilize the composition according to claim 10.

13. A binder plant constructed and arranged to use the composition according to claim 11.

14. The method of claim 1, wherein step b is performed to form a preparation comprising micronized polymer having polymer particles with a diameter of from 400 µm to 600 µm.

15. The method according to claim 2, wherein the polymer is a styrene-butadiene-styrene (SBS) copolymer.

16. The method according to claim 2, wherein step d. further includes the addition of from 1 wt. % to 5 wt. % of a crosslinking agent.

17. The method according to claim 3, wherein step d. further includes the addition of from 1 wt. % to 5 wt. % of a crosslinking agent.

18. The method according to claim 2, wherein the compatibilizing agent is chosen from the group composed of a wax based on a mixture of fatty acid derivatives, a paraffin wax, a wax of vegetable origin, a wax of animal origin, or a mixture thereof.

19. The method according to claim 3, wherein the compatibilizing agent is chosen from the group composed of a wax based on a mixture of fatty acid derivatives, a paraffin wax, a wax of vegetable origin, a wax of animal origin, or a mixture thereof.

20. The method according to claim 4, wherein the compatibilizing agent is chosen from the group composed of a wax based on a mixture of fatty acid derivatives, a paraffin wax, a wax of vegetable origin, a wax of animal origin, or a mixture thereof.

* * * * *